United States Patent
Tuli et al.

(10) Patent No.: US 11,523,289 B1
(45) Date of Patent: Dec. 6, 2022

(54) METHOD AND SYSTEM FOR ENHANCING CELLULAR NETWORK COVERAGE

(71) Applicant: T-Mobile Innovations LLC, Overland Park, KS (US)

(72) Inventors: Ashish Tuli, Ashburn, VA (US); Heitor Almeida, Plano, TX (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

(21) Appl. No.: 17/481,604

(22) Filed: Sep. 22, 2021

(51) Int. Cl.
*H04W 24/02* (2009.01)
*H04B 17/318* (2015.01)
*H04W 16/18* (2009.01)

(52) U.S. Cl.
CPC .......... *H04W 24/02* (2013.01); *H04B 17/318* (2015.01); *H04W 16/18* (2013.01)

(58) Field of Classification Search
CPC ..... H04W 16/00; H04W 16/18; H04W 4/029; H04W 4/021; H04W 8/18; H04W 24/02; H04W 24/04; H04W 72/04; H04W 72/06; H04W 72/08; H04W 72/10
See application file for complete search history.

(56) References Cited

U.S. PATENT DOCUMENTS

| 9,148,521 | B2* | 9/2015 | Mohan | G06Q 10/0635 |
| 2016/0344606 | A1* | 11/2016 | Baccarani | H04L 41/5067 |
| 2017/0032391 | A1* | 2/2017 | Sharma | G06Q 30/0204 |
| 2019/0026212 | A1* | 1/2019 | Verkasalo | H04L 67/535 |
| 2021/0076237 | A1 | 3/2021 | Chow et al. | |

FOREIGN PATENT DOCUMENTS

| WO | WO-2014166523 A1 * | 10/2014 | G06F 11/3006 |
| WO | WO-2018132901 A1 * | 7/2018 | H04L 41/5009 |
| WO | 2019/034805 A1 | 2/2019 | |

* cited by examiner

*Primary Examiner* — Kevin Kim

(57) ABSTRACT

Systems and methods are provided for enhancing cellular network coverage. In order to enhance network coverage, churn data is correlated with the measured coverage data for the multiple locations in the cellular network. Based on the correlation, a network readiness status in the multiple locations is determined. Network resources are then deployed to any of the multiple locations determined to have a network readiness status of not ready.

20 Claims, 11 Drawing Sheets

METHOD AND SYSTEM FOR ENHANCING CELLULAR NETWORK COVERAGE

TECHNICAL BACKGROUND

A wireless network, such as a cellular network, can include an access node (e.g., base station) serving multiple wireless devices or user equipment (UE) in a geographical area covered by a radio frequency transmission provided by the access node. As technology has evolved, different carriers within the cellular network may utilize different types of radio access technologies (RATs). RATs can include, for example, 3G RATs (e.g., GSM, CDMA etc.), 4G RATs (e.g., WiMax, Long Term Evolution (LTE), etc.), and 5G RATs (new radio (NR)). To ensure consistent coverage through a wide geographic range, existing technologies such as 4G are often used in combination with newer technologies such as 5GNR. However, while newer technologies may be increasingly deployed in urban and suburban areas, small town and rural areas may continue to be supported primarily through older technologies such as 4G LTE. Accordingly, 4G LTE network readiness, particularly in small towns becomes increasingly important in order to serve existing user devices.

Thus, while many metrics exist for scoring network performance as a whole, these metrics do not universally allow for scoring different RATs separately. While mobile users in urban areas often have multiple high performing network choices and different RATs available, mobile users in less populated areas may strive to seek a single carrier and/or single RAT providing satisfactory coverage.

Deployment of an accurate and consistent methodology for evaluating network readiness would provide the ability to enhance cellular network coverage when deficiencies are located. Accordingly, a solution is needed for evaluating network readiness in manner that enables efficient deployment of resources to enhance cellular network coverage.

Overview

Exemplary embodiments described herein include systems, methods, and nodes for enhancing cellular network coverage. An exemplary method for enhancing cellular network coverage includes collecting measured coverage data for multiple locations in the cellular network and collecting churn data for the multiple locations. The method further includes correlating the churn data with the measured coverage data for the multiple locations in the cellular network and determining a network readiness status in the multiple locations based on the correlation of the churn data with the measured coverage data. The method further includes deploying network resources to any of the multiple locations determined to have a network readiness status of not ready.

In a further exemplary embodiment, an access node is provided that includes at least one processor programmed for performing multiple operations. The multiple operations include correlating churn data with at least one coverage metric for multiple locations in a cellular network and determining a network readiness status in the multiple locations based on the correlation of the churn data with the coverage metric. The operations further include deploying network resources to any of the multiple locations determined to have a network readiness status of not ready.

In a further exemplary embodiment, a system is provided that includes an access node including at least one processor programmed to perform multiple operations. The operations include collecting measured coverage data for multiple locations in the cellular network, collecting churn data for the multiple locations, and correlating the churn data with the measured coverage data for each of the multiple locations in the cellular network. The operations further include determining a network readiness status in the multiple locations based on the correlation of the churn data with the measured coverage data and deploying network resources to any of the multiple locations determined to have a network readiness status of not ready.

DETAILED DESCRIPTION

Figure 1:
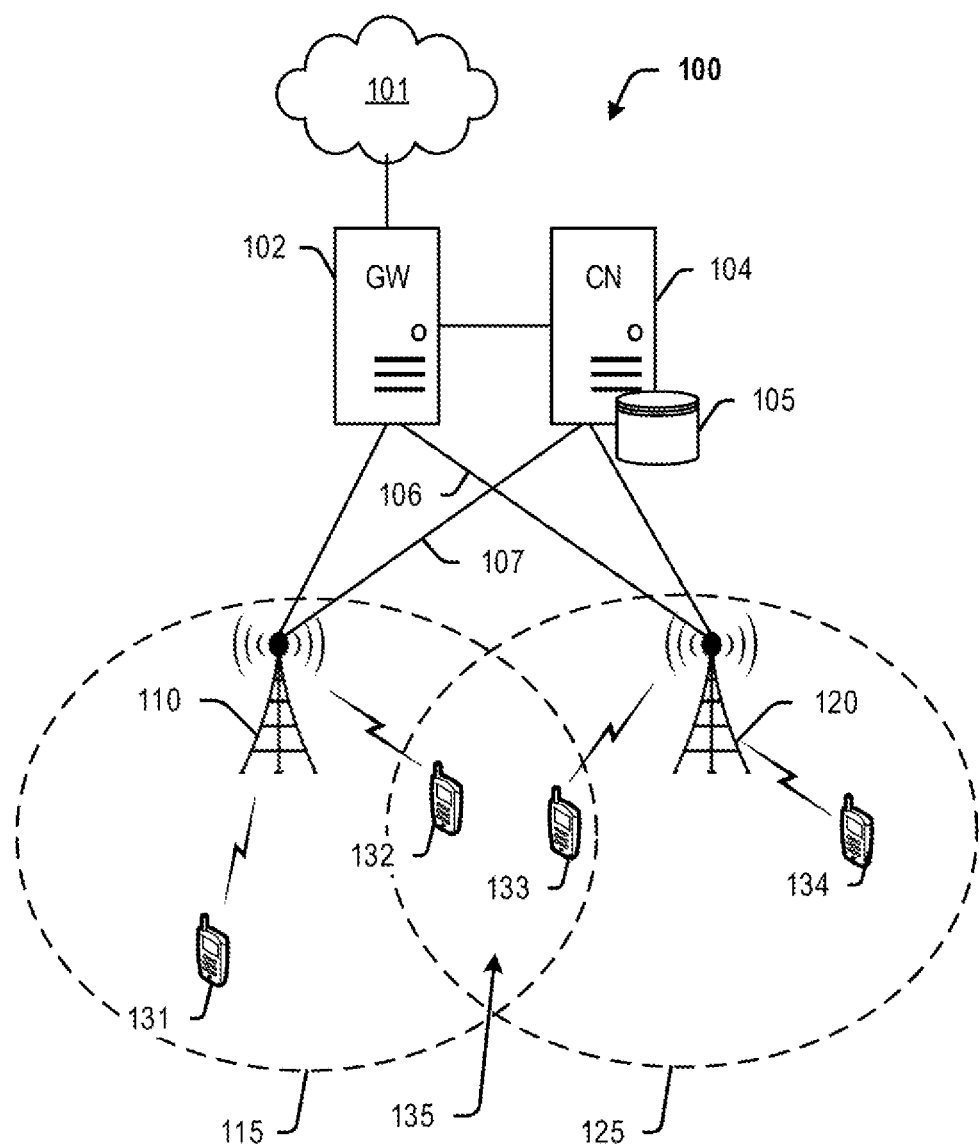
FIG. 1 depicts an exemplary system for wireless communication in accordance with the disclosed embodiments.

Exemplary embodiments described herein include systems, methods, access nodes for enhancing cellular network coverage. Accordingly, in order to enhance cellular network coverage, embodiments described herein evaluate network readiness. In embodiments disclosed herein, a cell or wireless network may be provided by an access node. The access node may utilize one or more antennas to communicate with wireless devices or user equipment (UEs). Performance at a particular wireless device may be dependent on a number of factors including, for example, antenna performance parameters, network loading conditions, and wireless device location within a cell or a sector. Because certain network conditions are likely to result in poor performance of wireless devices in the network, embodiments provided herein perform a method for evaluating network readiness in a manner calculated to optimize wireless device performance and thus customer satisfaction throughout the network. The evaluation of network readiness may be accomplished by an access node or processing node.

Network readiness has generally been evaluated based on various coverage metrics. Embodiments described herein correlate a churn rate with existing coverage metrics in order to evaluate network readiness. When networks are determined to have a status of "not ready", based on the correlation of coverage metrics with churn rate, methods described herein deploy resources to enhance network coverage.

The churn rate may be characterized as a number of subjects moving out of a collective group over a specific time period. In telecommunications, the churn rate can be defined as the rate of customer attrition. Churn increases progressively from urban to suburban to suburban fringe to small town areas. Areas with higher churn rates are often considered network not ready areas. As will be further explained herein, churn rate is correlated well with all coverage metrics.

The rate of customer attrition may be expressed as a percentage of service subscribers who discontinue their subscriptions within a given time period, thus measuring a network's loss in subscribers for a given period of time. Thus, churn rate may be expressed as:

$$\text{number of churned customers/total number of customers} \quad (1)$$

Accordingly, a higher churn rate may indicate that wireless subscribers are having an unsatisfactory experience. In embodiments disclosed herein, multiple coverage metrics can be correlated with the churn rate in order to calculate a normalized score. Thus, while the coverage metrics may use scales that differ from one another, the normalized score adjusts the coverage metrics to a notionally common scale. In operation, the coverage metrics and churn rate are considered for multiple different areas, which may for example, be census block groups.

Further, embodiments disclosed herein consider the difference in coverage metrics between one network and another and how these differences correlate to churn rate. The difference in coverage metrics between networks or "gap to competition" may function as an indicator of network readiness.

Thus, embodiments set forth herein are based on the determination that churn rate is correlated well with coverage metrics. Hence, multiple coverage metrics such as in-building residential coverage, measured crowd source coverage data, Mosaik coverage, etc. can be converted to a score using churn rate as a baseline and the score can be used to perform a carrier's own network assessment as well as effective competitive coverage assessments.

The determination of a network not ready status based on correlation of churn data with coverage metrics and correlation of churn data with a difference in coverage metrics between networks provides an indication that network enhancement is needed. Accordingly, based on the determination that a network is in a not ready status in one or more of multiple locations, embodiments disclosed herein deploy additional network resources to those locations.

In embodiments set forth herein, evaluation of network readiness for multiple areas is based on coverage metrics and churn data. When the access node, processor, or processing node identifies a location having a network not ready status, it may be programmed to recommend deployment of additional resources to the network in the identified area. In embodiments set forth herein, network readiness may be evaluated for a single RAT or more than one RAT, depending on availability in the multiple locations. Deployment of additional resources may include deployment of additional cell towers, antennas, base stations, access nodes, relay nodes, or other resources, with the goal of achieving network readiness in all of the multiple locations.

The term "wireless device" refers to any wireless device included in a wireless network. For example, the term "wireless device" may include a relay node, which may communicate with an access node. The term "wireless device" may also include an end-user wireless device, which may communicate with the access node through the relay node. The term "wireless device" may further include an end-user wireless device that communicates with the access node directly without being relayed by a relay node.

The terms "transmit" and "transmission" in data communication may also encompass receive and receiving data. For example, "data transmission rate" may refer to a rate at which the data is transmitted by a wireless device and/or a rate at which the data is received by the wireless device.

An exemplary system described herein includes at least an access node (or base station), such as an eNB or a gNB), and a plurality of end-user wireless devices. For illustrative purposes and simplicity, the disclosed technology will be illustrated and discussed as being implemented in the communications between an access node (e.g., a base station) and a wireless device (e.g., an end-user wireless device). It is understood that the disclosed technology may also be applied to communication between an end-user wireless device and other network resources, such as relay nodes, controller nodes, antennas, etc. Further, multiple access nodes may be utilized. For example, some wireless devices may communicate with an LTE eNB and others may communicate with an NR gNB. Other wireless devices may interact with both an eNB and a gNB.

In addition to the systems and methods described herein, the operations for enhancing cellular network coverage may be implemented as computer-readable instructions or methods, and processing nodes on the network for executing the instructions or methods. The processing node may include a processor included in the access node or a processor included in any controller node in the wireless network that is coupled to the access node.

FIG. 1 depicts an exemplary system 100 for use in conjunction with embodiments disclosed herein. System 100 comprises a communication network 101, gateway 102, controller node 104, access nodes 110 and 120, and wireless devices 131, 132, 133, and 134. Access node 110 is illustrated as having a coverage area 115. Access node 120 is illustrated as having a coverage area 125. In either case, each access node 110, 120 can deploy one or more radio air interfaces that utilize one or more frequency bands, enabling wireless communication with wireless devices 131, 132, 133, 134.

As shown herein, wireless devices 131, 132 attach to access node and wireless devices 133, 134 attach to access node 120. Although access nodes 110, 120 and wireless devices 131, 132, 133, 134 are illustrated in FIG. 1, any number of access nodes and wireless devices can be implemented within system 100.

Wireless devices 131, 132, are located within coverage area 115 and access network services from access node 110. Wireless device 133 and 134 are located within coverage area 125 and access network services from access node 120. Further, wireless devices 132 and 133 are located within potential interference area 135 formed by an overlap of coverage areas 115 and 125.

Further, a scheduling entity (within, for example, one or both of access nodes 110, 120, or controller node 104) may be configured to determine network readiness in multiple locations, allocate resources and provide recommendations for cellular network coverage enhancement.

Access nodes 110, 120 can be any network node configured to provide communication between wireless devices 131-134 and communication network 101, including standard access nodes and/or short range, low power, small access nodes. For instance, access nodes 110, 120 may include any standard access node, such as a macrocell access node, base transceiver station, a radio base station, gNBs in 5G networks, or eNBs in 4G/LTE networks, or the like. In an exemplary embodiment, a macrocell access node can have a coverage area 115, 125 in the range of approximately five kilometers to thirty five kilometers and an output power in the tens of watts. In other embodiments, access nodes 110, 120 can be a small access node including a microcell access node, a picocell access node, a femtocell access node, or the like such as a home NodeB or a home eNodeB device. Moreover, it is noted that while access nodes 110, 120 are illustrated in FIG. 1, any number of access nodes can be implemented within system 100.

Access nodes 110, 120 can comprise processors and associated circuitry to execute or direct the execution of computer-readable instructions to perform operations such as those further described herein. Briefly, access nodes 110, 120 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access nodes 110, 120 can receive instructions and other input at a user interface. Access nodes 110, 120 communicate with gateway node 102 and controller node 104 via communication links 106, 107. Access nodes 110, 120 may communicate with each other and with other access nodes (not shown) using a direct link such as an X2 link or similar.

Wireless devices 131-134 may be any device, system, combination of devices, or other such communication platform capable of communicating wirelessly with access nodes 110, 120 using one or more frequency bands deployed therefrom. Wireless devices 131-134 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access nodes 110, 120.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 131-134. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communication links 106, 107 may include Si communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as LTE or 5G NR can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information, such as predetermined noise thresholds and positions and characteristics of wireless devices 131-134. The database 105 may further store channel information, scheduling schemes and resource allocations for each of access nodes 110, 120 and wireless devices connected thereto, and so on. This information may be requested by or shared with access nodes 110, 120 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, cellular towers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access nodes 110, 120 and communication network 101.

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes, including access nodes, controller nodes, and gateway nodes described herein.

Figure 2:
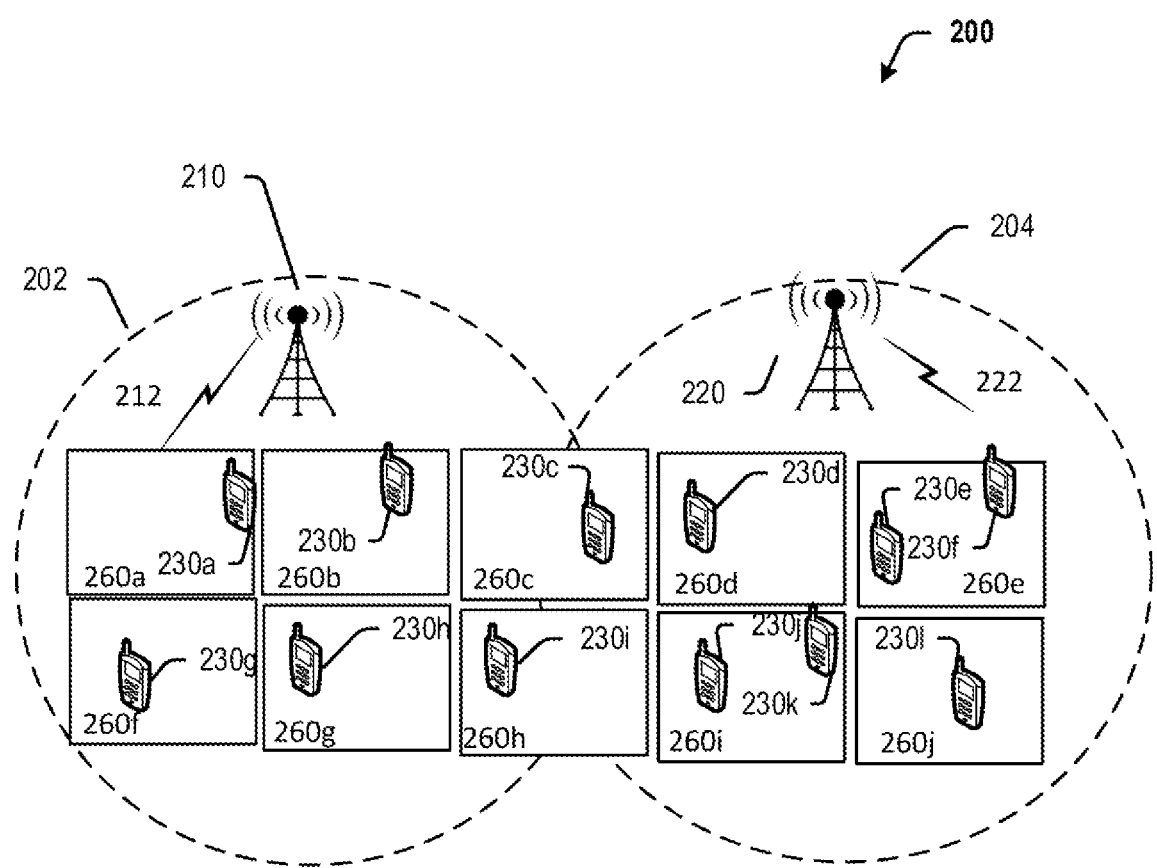
FIG. 2 illustrates an exemplary configuration of a wireless network covering multiple locations in accordance with disclosed embodiments.

FIG. 2 illustrates an exemplary configuration of a portion of a wireless network 200 covering multiple locations in accordance with disclosed embodiments. The wireless network 200 includes access node 210 having coverage area 202 and access node 220 having coverage area 204. Multiple locations within the coverage areas 202 and 204 include locations 260a-260j. Multiple wireless devices 230a-230l may be communicating from within the multiple locations 260a-260j. In embodiments as set forth herein, additional components, such as those shown in FIG. 1, may be included in the wireless network 200. Other components such as gateways, controller nodes, user plane functions, etc. may also be included. The access nodes 210 and 220 may have the same or similar characteristics as the access nodes described above with respect to FIG. 1. For example, the access nodes 210, 220 may be or include an eNodeB or gNodeB and may deploy one or more wireless air interfaces 212, 222 utilizing 4G LTE, 5G NR or other technologies.

The wireless devices 230a-230l may be substantially as those described above with respect to FIG. 1. The wireless devices 230a-1 may be configured to communicate over one or more RATs and may be low power user equipment (LPUE) or high power user equipment (HPUE).

The multiple locations 260a-260j may be or include census blocks, census block groups, census tracts, or other defined geographical area. Census blocks are grouped into census block groups, which are grouped into census tracts. Census blocks typically have a four-digit number; the first number indicates which block group the block is in. In embodiments set forth herein, the multiple locations are census blocks, which is the smallest of these defined geographical locations. However, other geographical categorizations may be utilized in order to determine network readiness in embodiments set forth herein.

For example, a processing node communicatively coupled to access node 210 or 220 can be configured to determine the readiness status of the network 200 in each of the multiple locations 260a-260j. Thus, while the network may be determined to be in a ready status for location 260a and thus have a satisfactory performance for the wireless device 230a, the access nodes may find that the network is not ready for location 260f and that performance is not satisfactory for the wireless device 230g.

The access node 210 or 220, may determine network readiness and return the network readiness status to a controller node, such as controller node 104 or to a processing node coupled to the access node 210 or 220 to provide recommendations for network coverage enhancement. Further, a processing node communicatively coupled to any of access nodes 210, 220 can be configured to allocate air interface resources to the multiple locations 260a-260l to improve the performance of the wireless devices 230a-230l. For example, the access nodes 210, 220 may be provided with additional antenna elements, which may deploy different radio air interfaces using a different frequency. For example, each antenna element can be configured to deploy a 4G LTE air interface or a 5G NR air interface. Different quantities of antenna elements can be configured to deploy (or "assigned" to) a different type of air interface depending on the needs of a network operator or users. Further, in split mode or "concurrent mode", individual antenna elements can be configured to simultaneously deploy at least two different air interfaces which enables wireless devices 230a-230l transmit uplink data via two air interfaces simultaneously. Further, the access nodes 210, 220 may determine that, due to a large number of network not ready locations, additional access nodes or cellular towers are needed to effectively serve the locations 260l-260j and the wireless devices 230a-230l.

Further, the methods, systems, devices, networks, access nodes, and equipment described herein may be implemented with, contain, or be executed by one or more computer systems and/or processing nodes. The methods described above may also be stored on a non-transitory computer readable medium. Many of the elements of the network 101 and 200 may be, comprise, or include computers systems and/or processing nodes. This includes, but is not limited to: access nodes 110, 120, 210, 220, controller node 104, and/or network 101.

Figure 3:
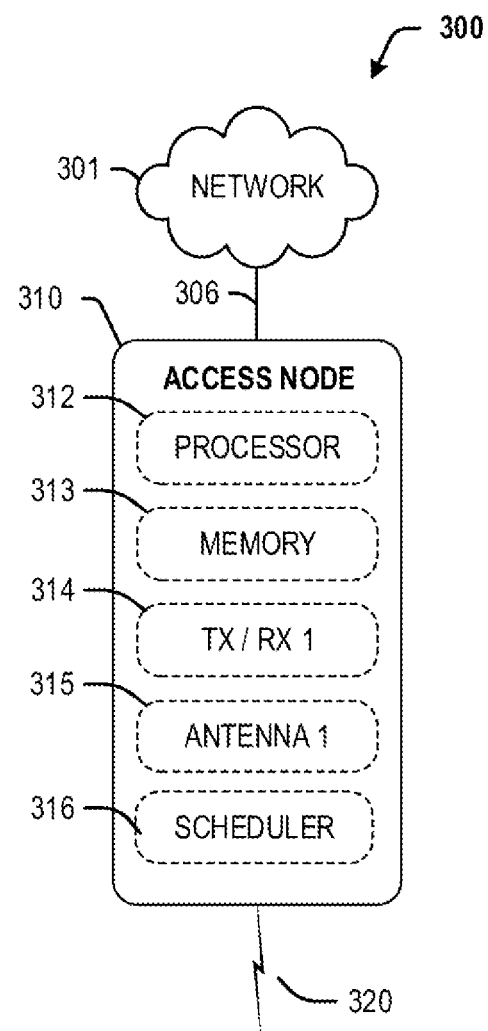
FIG. 3 depicts an access node in accordance with disclosed embodiments.

FIG. 3 is a block diagram 300 depicting an exemplary access node 310. Access node 310 may comprise, for example, a macro-cell access node, such as access node 310 described with reference to FIG. 1. Access node 310 is illustrated as comprising a processor 312, memory 313, a transceiver TX/RX 314, and antenna 315, and a scheduler 318. The transceiver 314 and antenna 315 may be provided for deploying a radio air interface 320. Although not shown, multiple transceivers and antennas may be deployed in order to provide multiple radio air interfaces. The multiple radio air interfaces may utilize the same or different frequency band or channel. It may be evident to those having ordinary skill in the art, that any combination of transceivers and antennae may be incorporated in order to deploy carriers of multiple frequencies, formed beams, MU-MIMO data streams, and/or to facilitate communication with other network nodes on network 301. Processor 312 executes instructions stored on memory 313, while transceiver 314 and antenna 315 enable wireless communication with other network nodes, such as wireless devices and other nodes. For example, access node 310 may be configured to determine coverage metrics and correlate the coverage metrics with churn data in order to derive a normalized score and determine network readiness. Scheduler 318 may be provided for scheduling resources based on the network readiness status. Network 301 may be similar to network 101 discussed above.

Further, instructions stored on memory 313 can include instructions for determining network readiness and providing recommendation for enhancing cellular network coverage, which will be further explained below with reference to FIGS. 4A-8. The instructions may facilitate determining coverage metrics for multiple locations, correlating the coverage metrics with churn data for the locations, providing a normalized score based on the correlation, and determining network readiness based on the normalized score.

FIGS. 4A-4D are bar graphs showing relationships between multiple coverage metrics and churn rate. It should be noted that network readiness is currently evaluated separately for each of these coverage metrics. For example, network readiness may currently be assessed at an RSRP of −110 dBM, at a home coverage score of 50, and at a NEX score of 50. However, these network readiness thresholds may be re-assessed and potentially integrated based on correlation with churn rate as set forth herein.

Figure 4A:
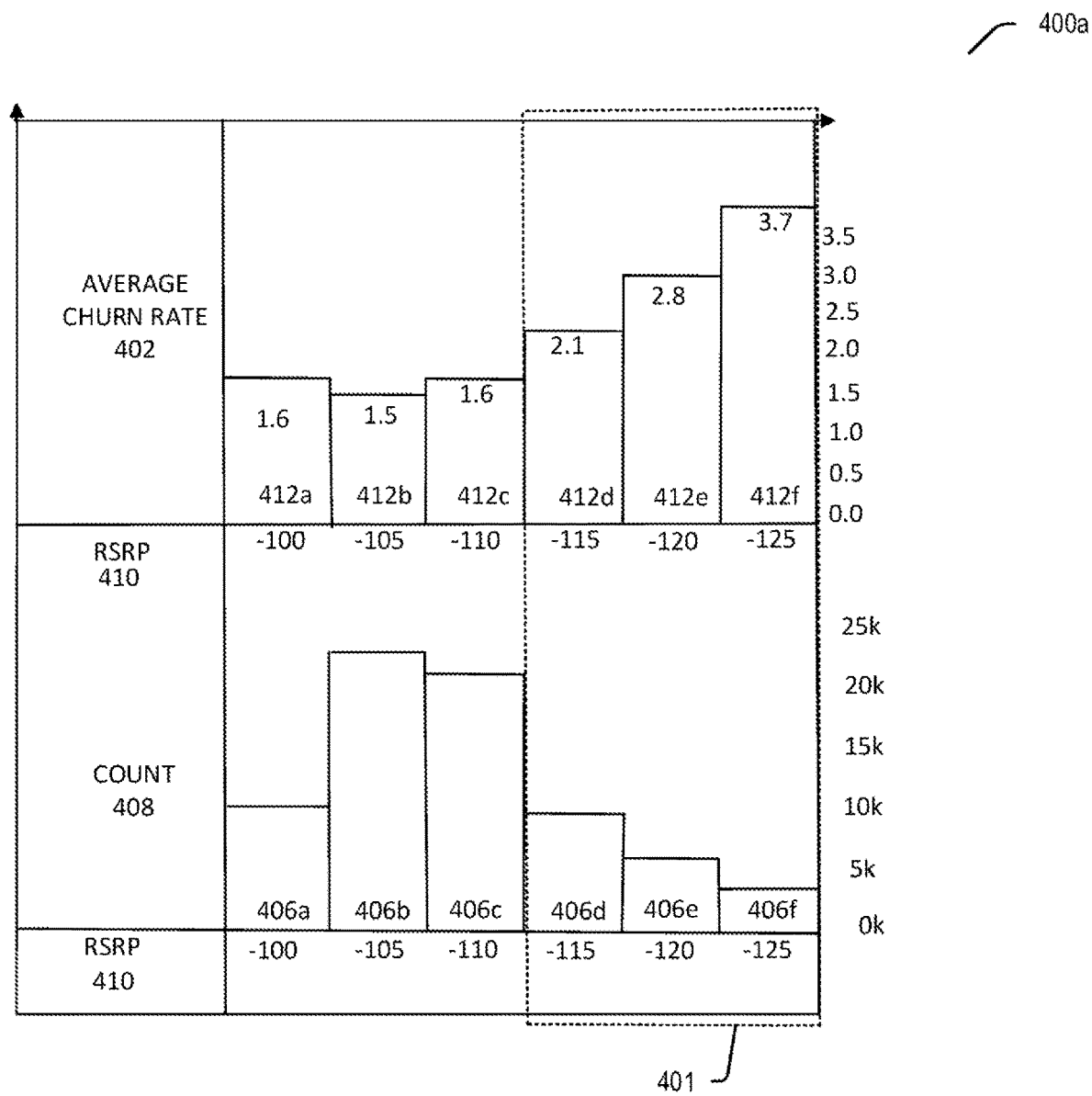
FIG. 4A depicts a correlation between churn rate and a coverage metric for multiple locations in accordance with the disclosed embodiments.

FIG. 4A is a bar graph 400a depicting a correlation between churn rate 402 and a coverage metric 410 for multiple locations in accordance with the disclosed embodiments. The locations may, for example, be small town locations. However, data can be collected and analyzed based on all locations served by the network or any subset of locations. The coverage metric displayed in FIG. 4A is reference signal received power (RSRP) 410 measured along the x axis. RSRP 410 may be measured in decibel milliwatts dBm. The RSRP may have an exemplary range of −45 dbm (good) to −140 dbm (bad). RSRP levels for usable signal typically range from about −120 dBm at the edge of LTE coverage to −75 dBm close to an LTE cell site.

A count 408 of locations, which may, for example, be census block groups, is also displayed along the y axis and average churn rate 402 for the particular locations is also shown along the y-axis. Bars 412a-412f show churn rate as a function of RSRP 410. Bars 406a-406f show a count of locations correlated with RSRP 410.

Evaluation of the data includes determining at what RSRP value 410 the churn rate 402 experiences a dramatic increase. This enables scoring of an RSRP curve based on the churn rate. At an RSRP of −110 dBM, the churn rate does not display a dramatic increase, rising only from 1.5 to 1.6.

However, at −115 dBm, the churn rate displays a much greater increase from 1.6 to 2.1. The churn rate continues to increase dramatically at −120 dBm and −125 dBm. Accordingly, at −115 dBm, a score indicating that the network has a not ready status may be assigned. As will be further discussed below, scoring facilitates combining measured data from multiple sources in a meaningful manner. Accordingly, embodiments set forth herein score an RSRP curve based on churn rate. Thus, the outline 401 illustrates a boundary of RSRP values that are correlated with a churn rate indicating a network not ready status. While this correlation is described as being based on a dramatic increase in churn rate, it may additionally or alternatively be based on exceeding a predetermined churn rate value, such as 1.8 or 2.0. Also, bars 406d-406f show an associated number of locations experiencing this status. Embodiments set forth herein determine network readiness for each of these locations based on the correlation of the churn rate with the RSRP.

Figure 4B:
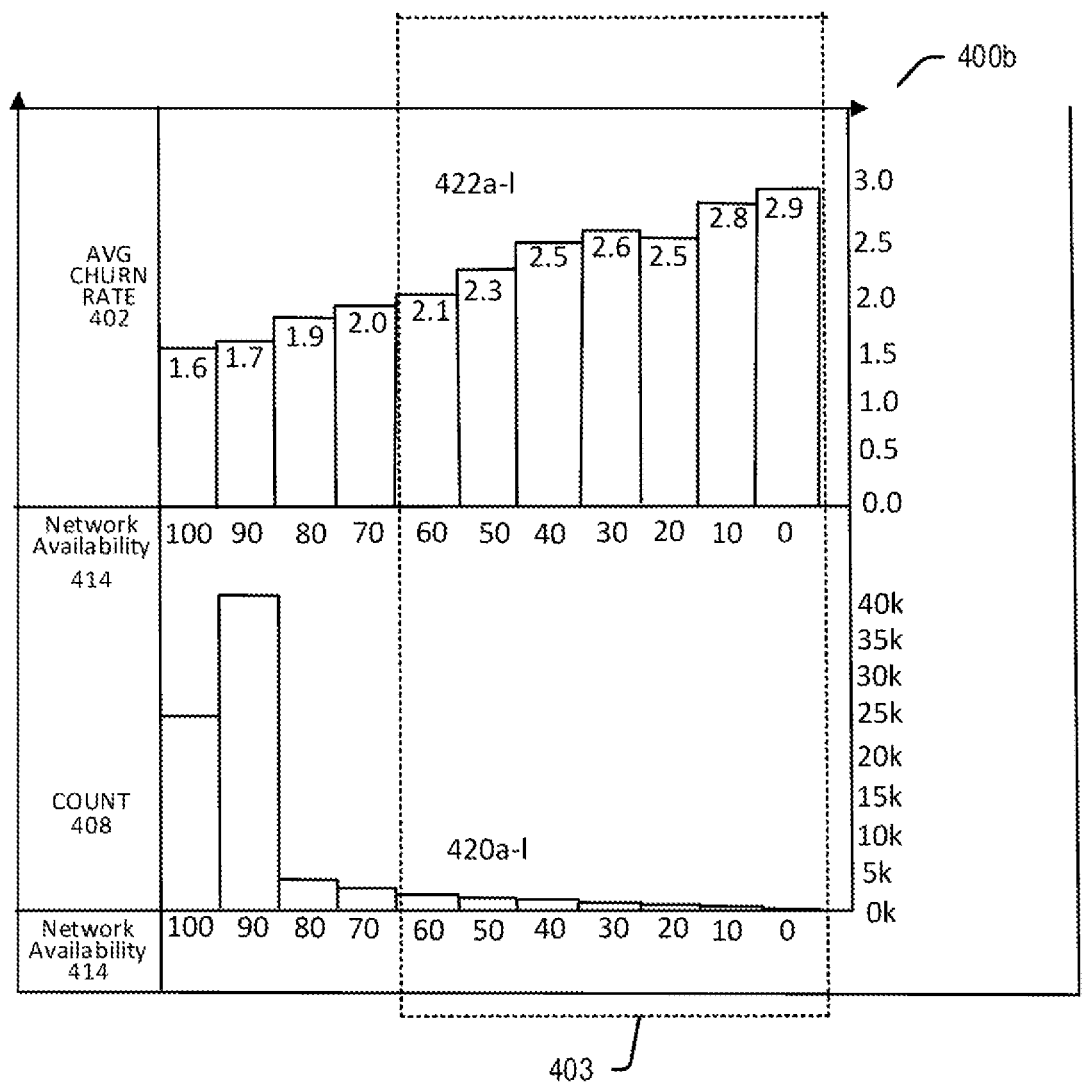
FIG. 4B depicts an exemplary correlation between churn rate and an availability score in accordance with disclosed embodiments.

FIG. 4B is a bar graph 400b depicting an exemplary correlation between churn rate 402 and a network availability score 414 in accordance with disclosed embodiments. The bar graph 400b may also include a count 408 of locations corresponding to each availability score. Bars 422a-1 express churn rate 402 as a function of network availability score 414 and bars 420a-1 express location count 408 as a function of network availability score 414. The availability score 414 may, for example, be a Mosaik availability score which can be determined from publicly available coverage maps released every quarter. The Mosaik availability score was designed to express availability scores for multiple networks. The Mosaik availability score is derived from collected and crowdsourced carrier signal quality data from major telecommunications providers or users who have its consumer or enterprise mobile application installed. The data provides snaps showing what networks offer the best service in multiple locations, which are at the census block group level. Embodiments set forth herein determine network readiness for each census block group based on the availability score.

As will be further described below with respect to the method of FIG. 8, methods described herein may also determine network readiness based on a gap between network performances. Accordingly, both availability score and a gap threshold must be satisfied in order to determine whether a census block group is network ready.

In the displayed scenario of FIG. 4B, the churn rate 402 rises above a value of 2.0 at a network availability score of 60 and further shows a pronounced increase at lower network availability scores. Accordingly, census block groups would need at least a 70 percent coverage score in order to qualify as network ready. Therefore, outline 403 shows the locations considered to be in network not ready status.

Figure 4C:
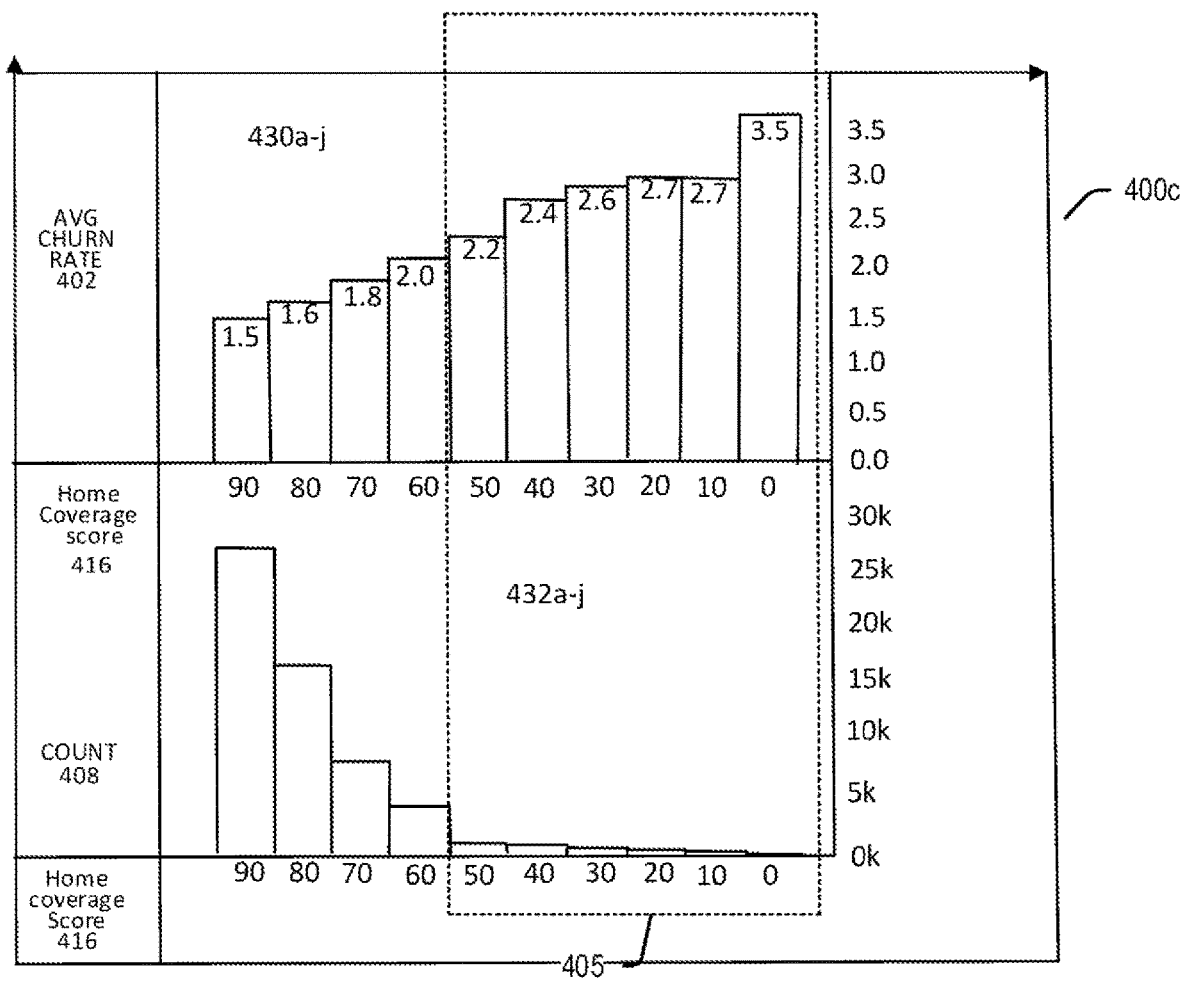
FIG. 4C is a chart illustrating a correlation between churn rate and another coverage metric in accordance with disclosed embodiments.

FIG. 4C is a bar graph 400c illustrating a correlation between churn rate 402 and another coverage metric, which may be a home coverage score 416 in accordance with disclosed embodiments. The home coverage score 416 may be calculated based on coverage scores within the homes of wireless device subscriber. The count 408 is also shown to correlate a number of locations with the home coverage score 416. Bars 430a-j represent churn rate 402 as a function of home coverage score 416 and bars 432a-j represent count 408 as a function of home coverage score 416.

As displayed, a large percentage of users have high coverage scores within their homes. For wireless device subscribers not having a high home coverage score, the average churn rate becomes very high, rendering the network not ready. Area 405 shows encompasses the network not ready areas and the number of impacted locations based on the home coverage score 416.

Figure 4D:
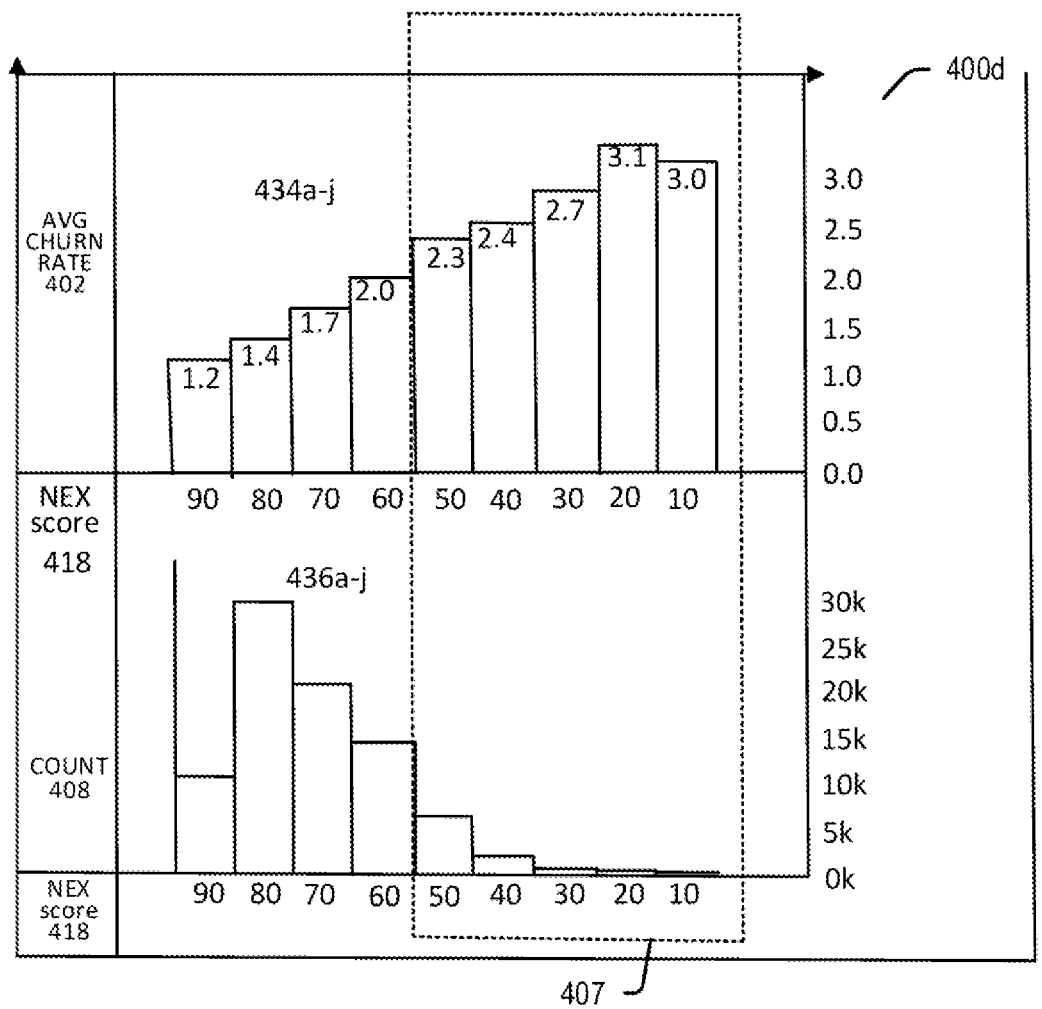
FIG. 4D is a chart illustrating a correlation between churn rate and an additional coverage metric in accordance with disclosed embodiments.

FIG. 4D is a bar graph 400d illustrating a correlation between churn rate 402 and an additional coverage metric 418 known as NEX score. The NEX score blends multiple key performance indicators (KPIs) together in order to arrive at a score. The KPIs may include, for example: dropped call rate; customer speed; and roaming. The NEX score 418 is shown along the x-axis and average churn rate 402 and location count 408 are shown along the y-axis. Bars 434a-j represent churn rate 402 as a function of NEX score 418 and bars 436a-j represent count 408 as a function of NEX score 418. Outline 407 shows an increase in churn rate to the network not ready status and how the churn rate 402 correlates to the NEX score 418.

The churn rate data is generally available to network providers from a sales or subscription department. Higher churn rates are indicative of a poor wireless device user experience. By methods disclosed herein, churn data is correlated with coverage metrics by determining at what baseline a step increase in churn occurs. From the correlation, different thresholds may be formulated for each coverage metric. Further, as shown in FIGS. 5 and 6, coverage curves may be derived from the correlations.

Figure 5:
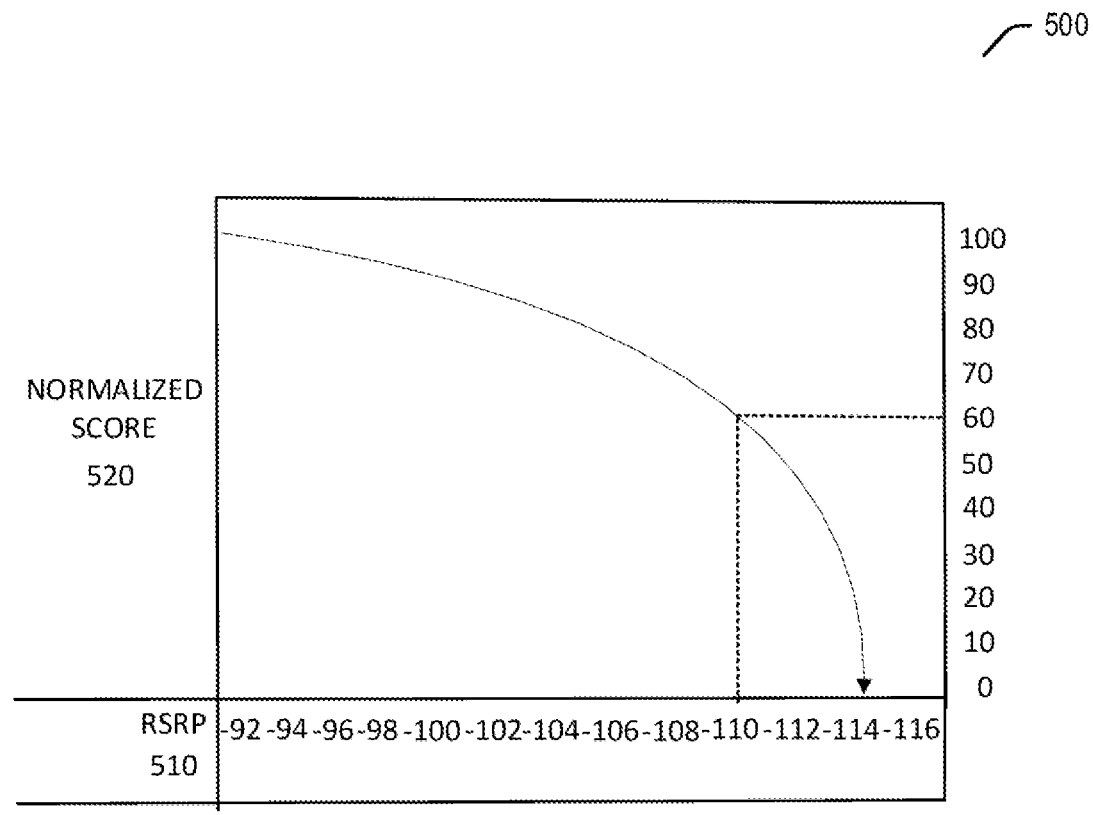
FIG. 5 is a chart illustrating a normalized network readiness score based on one of the correlations.

FIG. 5 is a graph 500 illustrating a normalized network readiness score 520 based on one of the correlations. Specifically, FIG. 5 illustrates the normalized score 520 based on the correlation with RSRP 510. As illustrated, the normalized score drops dramatically at an RSRP of approximately −110 dBm indicating insufficient network readiness. At −114 dBm, the score is assigned to zero. At an RSRP below −110 dBm, which corresponds to a score of 60, locations will be deemed as network not ready locations. Initially, the locations or census blocks scored at 60 or above are deemed network ready. However, as will be described below, networks with score at 60 are above may be re-evaluated as not ready if other available networks have significantly higher scores that meet a predetermined gap threshold.

Figure 6:
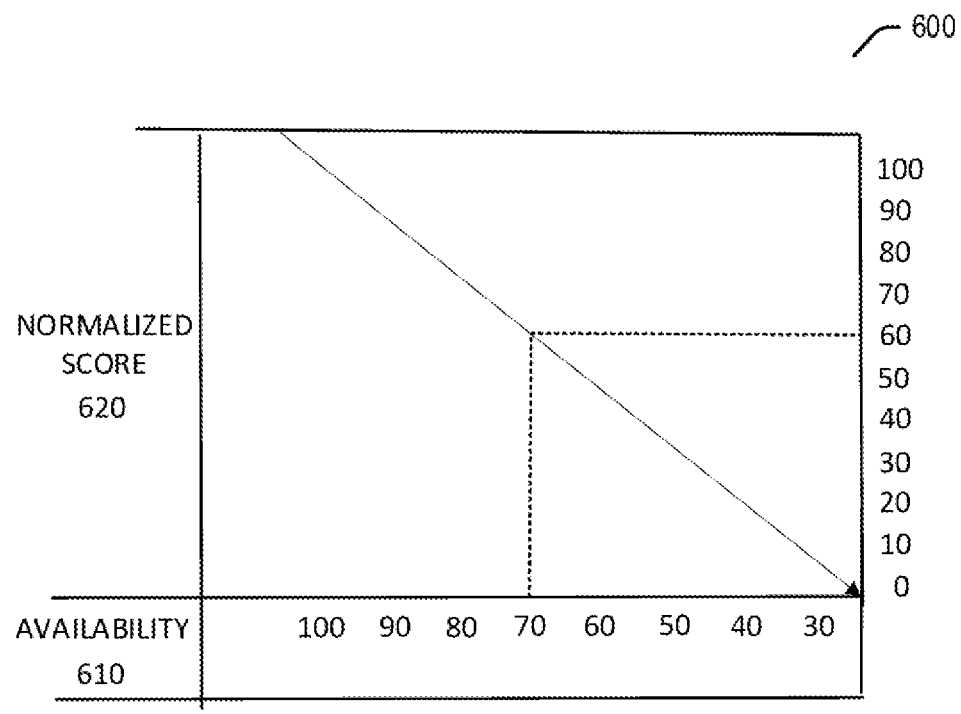
FIG. 6 is a chart illustrating an additional normalized network readiness score based on another correlation.

FIG. 6 is a graph 600 illustrating an additional normalized network readiness score 620 based on another correlation. Specifically, graph 600 illustrates a normalized readiness score 620 based on an availability score 610. A linear relationship is shown between churn rate and availability score 610.

Figure 7:
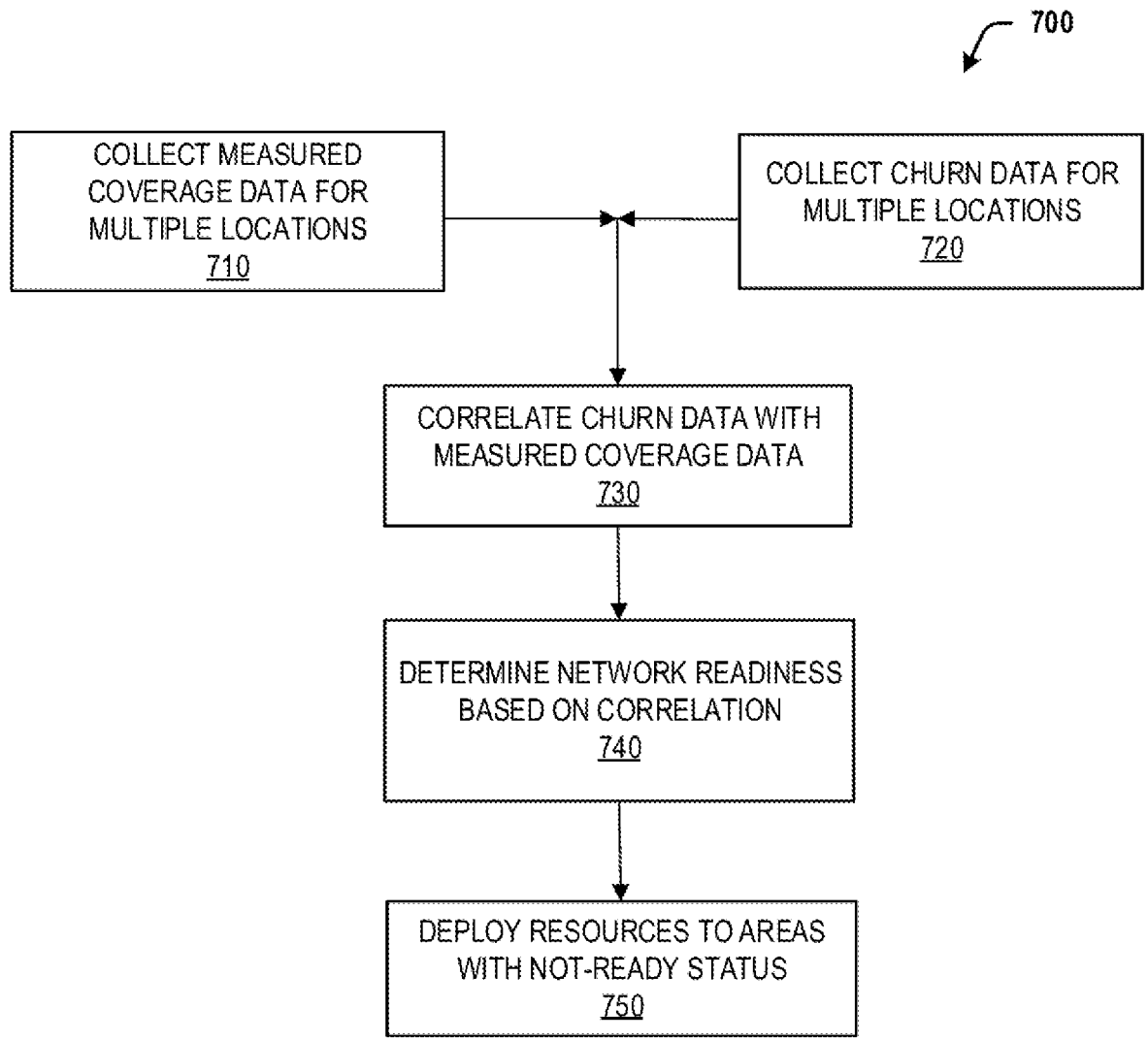
FIG. 7 is a flow chart depicting an exemplary method for enhancing cellular network coverage in accordance with disclosed embodiments.

FIG. 7 is a flow chart depicting an exemplary method 700 for enhancing cellular network coverage in accordance with disclosed embodiments. The steps illustrated in FIG. 7 may be performed by any suitable processor discussed herein, for example, a processor included in access node 110, 120, 210, or 220, or processor 312 included in access node 310 or controller node 104. For discussion purposes, as an example, method 700 is described as being performed by a processor included in access node 310.

Method 700 starts in step 710 when the access node 310 collects measured coverage data for the multiple locations, such as census block groups. As set forth above, the coverage data may be collected from wireless devices, from other network nodes, or from sources external to the network. In step 720, the access node 310 collects churn data for the multiple locations. The churn data may be collected from another network component, such as, for example, a database 105.

In step 730, the access node 310 correlates the coverage data, which may include any of the coverage metrics set forth above, with the collected churn data to establish a baseline for determining network readiness. In step 740, the access node 310 determines network readiness based on the correlation. In step 750, the access node 310 deploys or recommends deployment of additional resources to the network not ready locations. The resources may include, for example, cell towers, antennas, access nodes or other resources.

Figure 8:
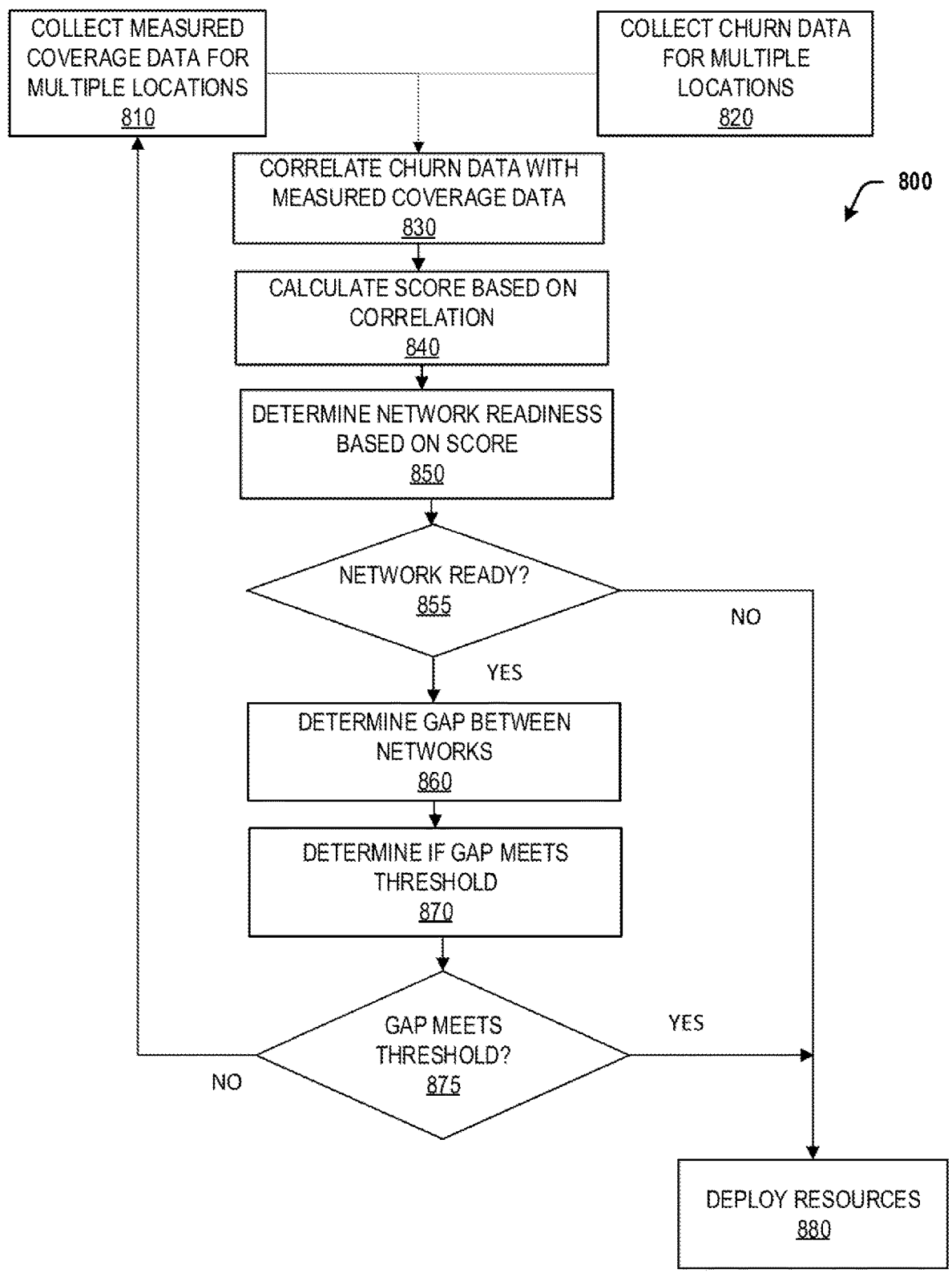
FIG. 8 is a flow chart depicting another another exemplary method for enhancing wireless network coverage in accordance with disclosed embodiments.

FIG. 8 is a flow chart depicting another exemplary method 800 for enhancing wireless network coverage in accordance with disclosed embodiments. The steps illustrated in FIG. 8 may be performed by any suitable processor discussed herein, for example, a processor included in access node 110, 120, 210, or 220, or processor 312 included in access node 310 or controller node 104. For discussion purposes, as an example, method 800 is described as being performed by a processor included in access node 310.

Method 800 starts in step 810 when the access node 310 collects measured coverage data for the multiple locations, such as census block groups. As set forth above, the coverage data may be collected from wireless devices, from other network nodes, or from sources external to the network. In step 820, the access node 310 collects churn data for the multiple locations. The churn data may be collected from another network component, such as, for example, a database 105.

In step 830, the access node 310 correlates the coverage data, which may include any of the coverage metrics set forth above, with the collected churn data to establish a baseline for determining network readiness.

In step 840, the access node 310 calculates a score for a location based on the correlation. The score may be a normalized score and normalization may occur by any known method. In step 850, the access node determines network readiness at the location based on the score. If the network is deemed not ready at step 855, the system deploys resources in step 880. The resources may be, or include, for example, antennas, cell towers, or additional network nodes.

If the network is deemed to be in ready status in step 855, the access node 310 determines a gap between networks in step 860. When another available network has superior coverage metrics, then despite an adequate network readiness score, additional resources may be deployed. Accordingly a gap threshold may be utilized. In embodiments set forth herein the gap threshold may be 30 points. The gap threshold may be set based on a determination of when the churn rate dramatically increases. Further, the gap threshold may be based on an assessment of all of the above-identified coverage metrics. If a first network has a score of 60, when the gap threshold is set to be 30 points, the second network must have a score of at least 90 for the gap threshold to be met. Although a gap threshold of 30 is used herein as an example, the gap threshold may vary, for example between 10 points and 40 points and may be set to reflect dramatic increases in churn rate. In embodiments set forth herein, a baseline churn rate may be selected and the gap threshold may be set when collected data shows that the gap leads to a churn rate exceeding the baseline churn rate. In step 870, the access node 310 determines if the gap meets the predetermined threshold. If, at step 875, the gap is determined to meet the threshold, the system deploys resources to the location in step 880. However, if the gap does not meet the threshold at step 875, the method ends or repeats without deployment of additional resources.

In some embodiments, methods 700 and 800 may include additional steps or operations. Furthermore, the methods may include steps shown in each of the other methods. As one of ordinary skill in the art would understand, the methods 700 and 800 may be integrated in any useful manner.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for enhancing cellular network coverage, the method comprising:
   collecting measured coverage data for multiple locations in the cellular network;
   collecting churn data for the multiple locations;
   correlating the churn data with the measured coverage data for the multiple locations in the cellular network;
   determining a network readiness status in the multiple locations based on the correlation of the churn data with the measured coverage data; and
   deploying network resources to any of the multiple locations determined to have a network readiness status of not ready.

2. The method of claim 1, wherein the measured coverage data comprises reference signal received power (RSRP) data collected from user equipment in the multiple locations.

3. The method of claim 1, further comprising converting the measured coverage data to a score based on the correlated churn data.

4. The method of claim 3, further comprising determining network readiness in the multiple locations based on the score.

5. The method of claim 4, further comprising generating a recommendation for resource allocation for the multiple locations evaluated as network not ready locations.

6. The method of claim 5, wherein the resource allocation comprises allocation of additional network resources.

7. The method of claim 1, further comprising converting the measured coverage data to a coverage score based on the correlation and determining a second coverage score for another cellular network.

8. The method of claim 7, further comprising determining a network readiness status based on the coverage score for the cellular network and the second coverage score.

9. The method of claim 8, further comprising determining a gap between the coverage score and the second coverage score to determine the network readiness status.

10. An access node comprising:
    at least one processor programmed to perform multiple operations, the operations including:
      correlating churn data with at least one coverage metric for multiple locations in a cellular network;
      determining a network readiness status in the multiple locations based on the correlation of the churn data with the coverage metric; and
      deploying network resources to any of the multiple locations determined to have a network readiness status of not ready.

11. The access node of claim 10, wherein the processor collects measured coverage data for multiple locations in the cellular network.

12. The access node of claim 11, wherein the measured coverage data comprises reference signal received power (RSRP) data collected from user equipment in the multiple locations.

13. The access node of claim 11, wherein the processor calculates a score based on the measured coverage data.

14. The access node of claim 13, wherein the processor correlates the score with the churn data and determines a network readiness status based on the correlation.

15. The access node of claim 14, wherein the processor generates a recommendation for resource allocation for the multiple locations evaluated as network not ready locations.

16. A system for enhancing cellular network coverage, the system comprising:
    an access node including at least one processor programmed to perform multiple operations, the operations including,
      collecting measured coverage data for multiple locations in the cellular network;
      collecting churn data for the multiple locations;
      correlating the churn data with the measured coverage data for each of the multiple locations in the cellular network;
      determining a network readiness status in the multiple locations based on the correlation of the churn data with the measured coverage data; and
      deploying network resources to any of the multiple locations determined to have a network readiness status of not ready.

17. The system of claim 16, wherein the measured coverage data comprises reference signal received power (RSRP) data collected from user equipment in the multiple locations.

18. The system of claim 16, the processor calculating a score based on the correlated churn data.

19. The system of claim 18, the processor determining network readiness in the multiple locations based on the score.

20. The system of claim 19, the processor generating a recommendation for resource allocation for the multiple locations evaluated as network not ready locations.

* * * * *